United States Patent
Reif et al.

(10) Patent No.: US 10,011,191 B2
(45) Date of Patent: Jul. 3, 2018

(54) SEAT FOR A CONSTRUCTION MACHINE, AND CONSTRUCTION MACHINE

(71) Applicant: Hamm AG, Tirschenreuth (DE)

(72) Inventors: Gernot Reif, Buckenhof (DE); Jürgen Hopf, Tirschenreuth (DE); Thomas Göhl, Mähring (DE)

(73) Assignee: Hamm AG (DE)

( * ) Notice: Subject to any disclaimer, the term of this patent is extended or adjusted under 35 U.S.C. 154(b) by 0 days.

(21) Appl. No.: 15/187,843

(22) Filed: Jun. 21, 2016

(65) Prior Publication Data

US 2017/0001540 A1   Jan. 5, 2017

(30) Foreign Application Priority Data

Jul. 2, 2015   (DE) .................. 10 2015 212 459

(51) Int. Cl.
*B60N 2/04* (2006.01)
*B60N 2/02* (2006.01)
*B60N 2/06* (2006.01)
*B60N 2/14* (2006.01)
*B60N 2/24* (2006.01)
(Continued)

(52) U.S. Cl.
CPC ......... *B60N 2/0244* (2013.01); *B60N 2/0248* (2013.01); *B60N 2/062* (2013.01); *B60N 2/08* (2013.01); *B60N 2/0881* (2013.01); *B60N 2/14* (2013.01); *B60N 2/146* (2013.01); *B60N 2/24* (2013.01); *B60N 2/38* (2013.01); *B60N 2/938* (2018.02); *B60N 2002/0272* (2013.01)

(58) Field of Classification Search
CPC .... B60N 2/0244; B60N 2/0248; B60N 2/062; B60N 2/08; B60N 2/0881; B60N 2/14; B60N 2/146; B60N 2/24; B60N 2/38; B60N 2/444; B60N 2002/0272
See application file for complete search history.

(56) References Cited

U.S. PATENT DOCUMENTS 5,474,353 A * 12/1995 Koester .................. B60N 2/062
                                                              296/65.07
5,722,617 A    3/1998 Cecinas
(Continued)

FOREIGN PATENT DOCUMENTS

CN    206124817 U    4/2017
DE    19728312 C1    1/1999
(Continued)

OTHER PUBLICATIONS

German Search Report in corresponding German Patent Application Serial No. 10 2015 212 459.2, dated Feb. 25, 2016, 9 pp. (not prior art).

(Continued)

*Primary Examiner* — Philip F Gabler
(74) *Attorney, Agent, or Firm* — Lucian Wayne Beavers; Patterson Intellectual Property Law, PC

(57) ABSTRACT

In a seat for a construction machine, comprising a seat console, a device for lateral displacement of the seat in a transverse direction relative to the direction of travel of the construction machine, and a seat rotating device, it is provided that a stop limiter device is operative to limit the maximum allowable rotational angle of the seat in a variable manner, each time in dependence on the set position of the lateral displacement of the seat.

22 Claims, 4 Drawing Sheets

(51) Int. Cl.
*B60N 2/08* (2006.01)
*B60N 2/38* (2006.01)
*B60N 2/90* (2018.01)

(56) References Cited

U.S. PATENT DOCUMENTS

| | | | | |
|---|---|---|---|---|
| 6,241,314 | B1* | 6/2001 | Pufall | B60N 2/2821 |
| | | | | 297/256.12 |
| 6,557,919 | B2* | 5/2003 | Suga | B60N 2/062 |
| | | | | 296/65.07 |
| 6,590,354 | B2* | 7/2003 | Hein | B60N 2/002 |
| | | | | 318/280 |
| 7,036,883 | B1* | 5/2006 | Thompson | B60N 2/0224 |
| | | | | 297/344.24 |
| 7,422,264 | B1* | 9/2008 | Lung | B60N 2/06 |
| | | | | 296/65.01 |
| 7,753,444 | B2* | 7/2010 | Vallentin | B60N 2/2821 |
| | | | | 297/256.12 |
| 2010/0001169 | A1* | 1/2010 | Armo | B60N 2/06 |
| | | | | 248/636 |
| 2013/0161990 | A1* | 6/2013 | Oleson | B64D 11/06 |
| | | | | 297/344.21 |
| 2017/0001540 | A1 | 1/2017 | Reif et al. | |

FOREIGN PATENT DOCUMENTS

| | | |
|---|---|---|
| DE | 202010015414 U1 | 2/2011 |
| DE | 102010045418 A1 | 3/2011 |
| DE | 102010029622 B4 | 7/2012 |
| EP | 2213504 A2 | 8/2010 |

OTHER PUBLICATIONS

Chinese Office Action dated Mar. 2, 2018 in corresponding Chinese application, 1 page (not prior art).

* cited by examiner

SEAT FOR A CONSTRUCTION MACHINE, AND CONSTRUCTION MACHINE

BACKGROUND OF THE INVENTION

Field of the Invention

The present invention relates to a seat for a construction machine, and to a construction machine, particularly a road construction machine, comprising such a seat.

Description of the Prior Art

From DE 20 2010 015 414 U, there is known a road construction machine in the form of a road milling machine wherein the machine operator seat is horizontally displaceable with the aid of an adjustment device.

When using such a seat that is displaceable and/or rotatable in various directions in a horizontal plane, there may occur undesired collisions of the machine operator or the seat with other elements of the construction machine that are located in the environment of the machine operator.

SUMMARY OF THE INVENTION

Thus, it is an object of the invention to provide a seat for a construction machine as well as a construction machine wherein the operation of the seat is improved.

The above object is achieved by the features defined in the claims.

The invention advantageously provides that, in a transversely displaceable seat, a stop limiter device is operative to limit the maximum allowable rotational angle of the seat in a variable manner, each time in dependence on the set position of the lateral displacement of the seat.

Such a stop limiter device creates a variable stopper which is dependent on the current rotational angle of the seat and the set position of the lateral displacement of the seat and will thus provide different stop limitations for different seat positions. Thereby, the process of seat adjustment is facilitated since, in specific operational situations of the construction machine, e.g. in a massively slanted position or when operating other machine elements, e.g. when performing a variable adjustment of steering consoles or display or control panels, the vehicle operator will consequently not have to give regard anymore to whether specific seat positions could happen to cause collisions with other machine elements. This can also be relevant if optional devices are retrofitted to the construction machine and thus might be located in the pivoting range of the rotatable seat.

The stop limiter device can be realized as a simple construction by mechanical means and, in seats for construction machines with electric drives, it can also be easily realized by electronic means.

The mechanical realization is particularly suited for inexpensive construction machines because the added expenditure is low.

Generally, the stop limiter device is adapted to be retrofitted.

Preferably, it is provided that the stop limiter device comprises or electronically predefines different stop positions for rotation of the seat to the left and to the right, respectively.

Generally, the stop limiter device makes it possible, in case of various optional accessories or in case that accessories are retrofitted, to consider specific design properties of an individual construction machine in connection with specific case constellations of a seat position in such a manner that the vehicle operator, when operating the seat, does not have to give regard anymore to possible collisions, particularly collisions involving the control lever fastened to the seat, thus also enhancing the safety when operating the seat.

The stop limiter device can comprise a slotted stopper guide and a stopper device cooperating with the slotted stopper guide. By means of the slotted stopper guide, exact stop positions for the stop limiter device are determined in dependence on the set position of the lateral displacement of the seat.

Preferably, the stop limiter device is arranged between the seat rotating device or said device for lateral displacement of the seat and the seat console. Generally, one part of the stop limiter device, namely the slotted stopper guide or the stop limiter device, is fastened to a rotatable part of the seat, and the other part (stop limiter device or slotted stopper guide) is fastened to the part of the seat that is immobile in transverse direction.

It can be provided that the slotted stopper guide is formed by a contour to be abutted by the stopper device at different sites in dependence on the lateral seat position and the current seat rotational position for limiting the rotational angle of the seat. In this arrangement, the contour will delimit the pivoting movement of the stop limiter device which preferably is coupled to a rotatable part of the seat.

The contour of the slotted stopper guide can comprise at least one limiting line for left-hand rotation and a further limiting line for right-hand rotation.

In regard to the above, it is to be understood that these limiting lines do not have to extend in a linear fashion or e.g. can also consist of a plurality of linear sections.

According to a preferred solution, it is provided that the slotted stopper guide is coupled to the seat console and the stopper device is coupled to the rotatable part of the seat. Preferably, it is provided that the stopper device comprises at least one stopper pin arranged to abut on the contour of the slotted stopper guide when the seat is rotated into one of the two directions of rotation, in order to limit the rotational angle of the seat.

The seat rotating device can comprise a rotating console having a rotary plate on which a seat plate of the seat is fastened coaxially to the axis of rotation of the rotary plate either rigidly or for eccentric rotation relative to the rotary plate.

According to a preferred embodiment, it is provided that the contour of the slotted stopper guide is formed in or on an intermediate plate, with the stopper device engaging into said intermediate plate. In this arrangement, the contour can be machined into the intermediate plate or e.g. be formed by an upward edge adapted to be abutted by the stop limiter device in case of a limitation of the rotational angle.

On the seat console, there can be arranged a device for displacing the seat in the direction of travel of the construction machine. This longitudinal adjustment device is arranged e.g. between the seat console and the stop limiter device.

According to a preferred exemplary embodiment, it is provided that said devices for displacing the seat in the direction of travel and respectively in transverse direction each comprise guide elements consisting of at least two cooperating parts of which respectively one part is fastened in a stationary manner to the intermediate plate and the respective other part is fastened in a stationary manner to the seat console and the seat rotating device, respectively.

In this arrangement, it can be provided that the part of said device for displacing the seat in the direction of travel that is fastened in a stationary manner to the intermediate plate is fastened to the bottom side of the intermediate plate, and part of said device for lateral displacement of the seat that is fastened in a stationary manner to the intermediate plate is fastened to the top side of the intermediate plate.

According to a preferred exemplary embodiment, the contour of the slotted stopper guide is formed by a cutout in the intermediate plate.

In an electronic variant of the stop limiter device, it is provided to detect the rotational angle of the seat and the set position of the lateral displacement of the seat by use of sensors. In this case, a maximum allowable rotational angle of the seat in both directions of rotation can be read from a memory of the database in dependence on the rotational angle and the displacement position, and the current rotational angle of the seat can be limited with the aid of an electronically controllable blocking device acting on the seat rotating device. The data to be stored in the memory for the maximum allowable rotational angle in both directions of rotation of the seat can be obtained empirically and individually and be kept in the memory. Said blocking device can be realized in the form of a common stopping device for the seat rotation that is electrically operable and is controllable in a corresponding manner by the electronic stop limiter device. Generally, with a blocking device actuated by a solenoid, the rotation of the seat can blocked or released by the push of a button.

The invention further relates to a construction machine, particularly a road construction machine such as e.g. a road milling machine or a road roller, comprising a seat as described above.

Exemplary embodiments of the invention will be disclosed in greater detail hereunder with reference to the drawings.

DETAILED DESCRIPTION OF PREFERRED EMBODIMENTS

Figure 1:
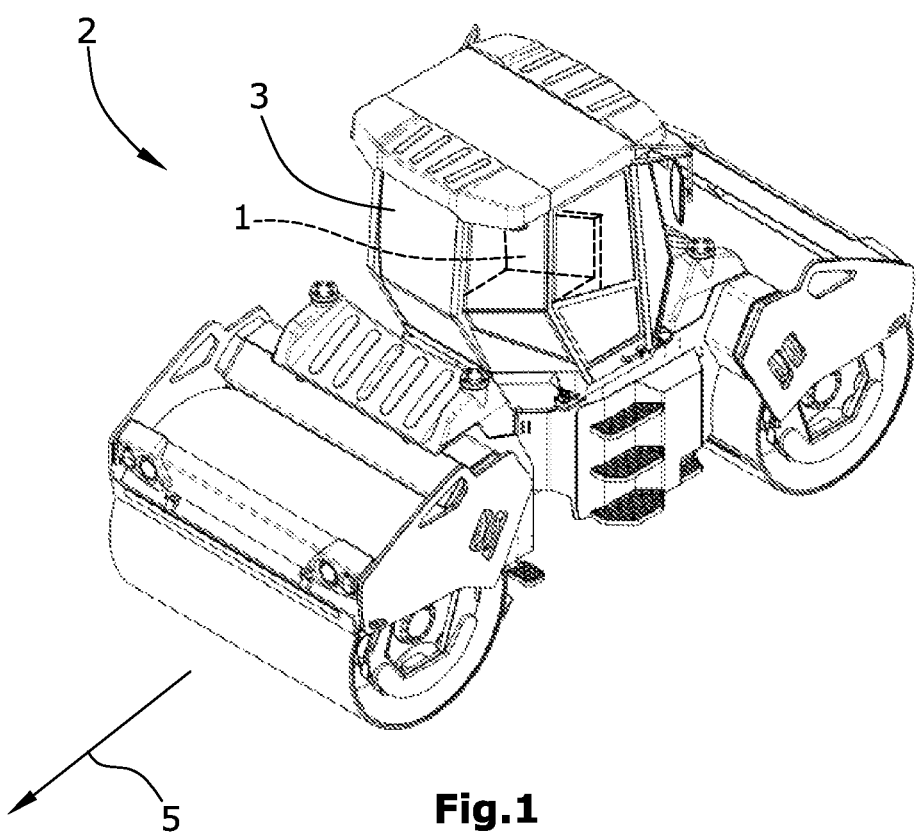
FIG. 1 shows a road construction machine in the form of a road roller.

FIG. 1 shows a construction machine in the form of a road construction machine, notably a road roller having a driver cabin 3 in which a seat 1 is arranged that is transversely displaceable and is rotatable.

Figure 2A:
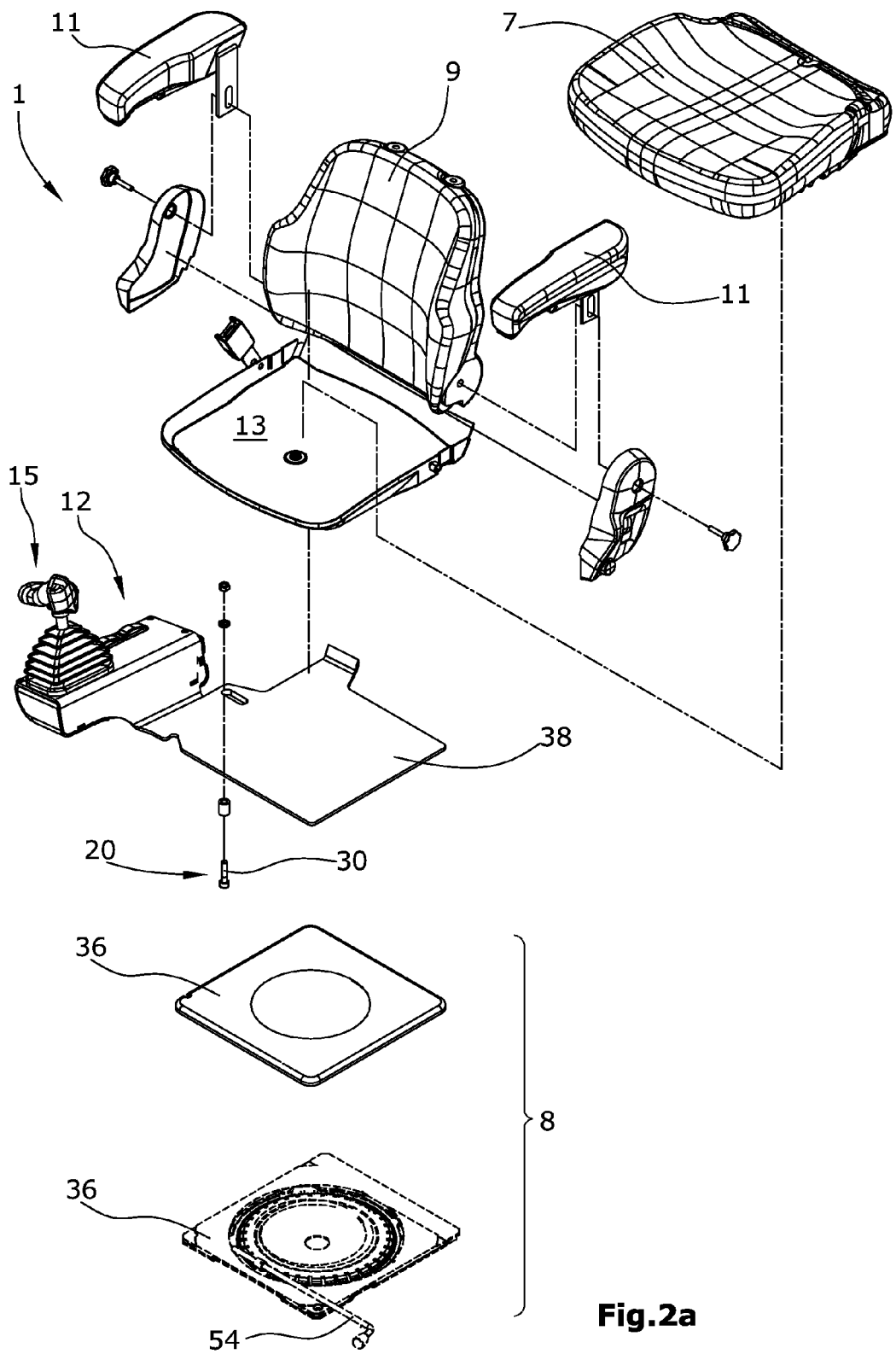
FIGS. 2a,2b,2c show a seat according to the invention in perspective exploded view.
Figure 2B:
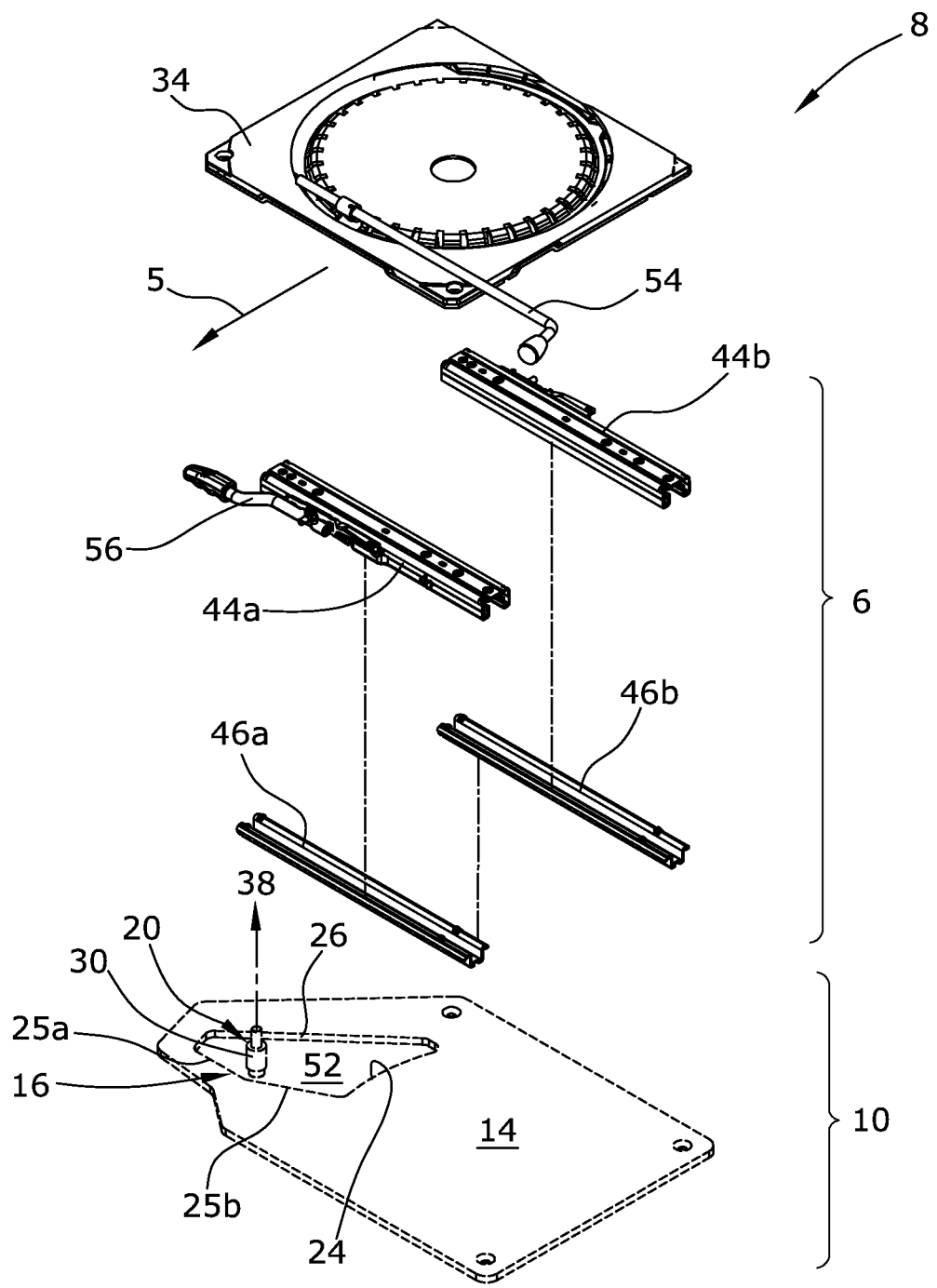
Figure 2C:
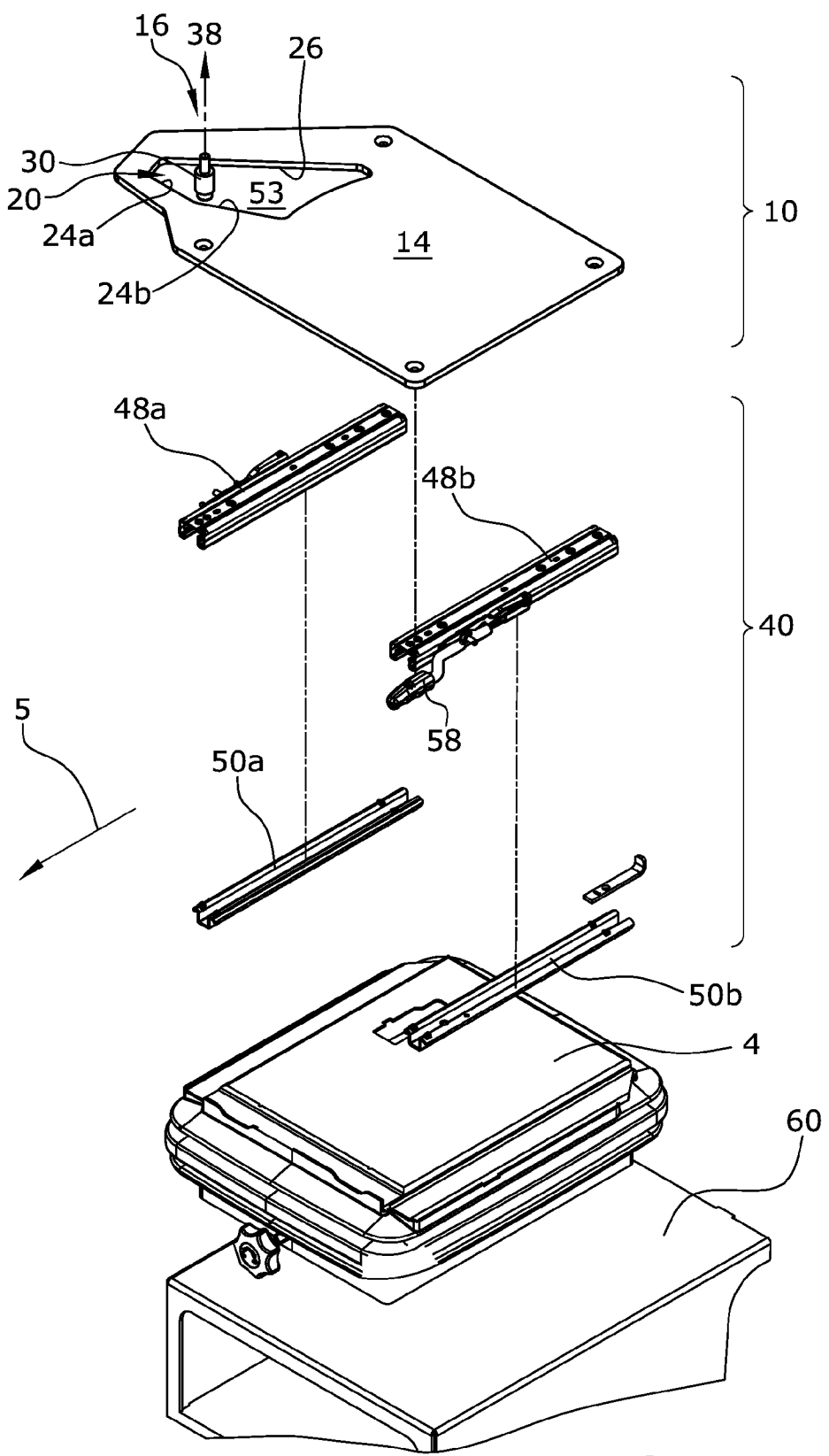

In FIGS. 2a to 2c, said seat 1 is shown in greater detail in perspective exploded view.

Seat 1 comprises, in a conventional manner, a seat surface 7 which can be mounted on a seat shell 13, and a backrest 9 and two armrests 11.

Said seat surface 7 together with seat shell 13 fastened to a seat plate 38 which, preferably on the right-hand side on an imaginary extension of armrest 11, comprises a control unit 12 having a control lever 15. Thus, the vehicle operator is able to operate the control unit 12 via his/her arm supported on armrest 11.

Seat plate 38, which generally could also be formed in one piece with seat shell 13, is in turn fastened to a seat rotating device 8 on a rotary plate 36 of seat rotating device 8. The rotating console 34 of seat rotating device 8 comprises, as a blocking device 54, a locking and unlocking device that is operable by hand or, in an electric variant of the seat, can be locked and unlocked with the aid of a solenoid by actuating a push button.

The view of FIG. 2b is the vertical continuation, in downward direction, of the view of FIG. 2a and at the top includes a repeated representation of rotating console 34 which had been shown in interrupted lines in FIG. 2a.

The rotating console 34, which does not rotate along with the pivotable seat elements, is connected to a device 6 for lateral displacement of the seat 1 in a transverse direction relative to the direction of travel 5—also indicated in FIG. 1—of construction machine 2.

Said device 6 for lateral displacement of seat 1 comprises guide elements 44a, 44b, 46a and 46b formed e.g. of rail elements, wherein respectively two rail elements in form of said guide elements 44a, 46a and respectively 44b and 46b cooperate in a known manner so as provide a transverse connection of the upper seat part relative to a seat console 4.

Preferably, the front upper guide element 44a comprises a lockable blocking device 56 which in an electrified embodiment can also be actuated by means of a solenoid and a pressure switch.

The lower guide elements 46a,46b are fastened to an intermediate plate 14 which is a component of a mechanical stop limiter device 10.

The mechanical stop limiter device 10 comprises a cutout 52 forming a slotted stopper guide 16 which cooperates with a stopper device 20 e.g. in the form of a stopper pin 30, so as to allow for a stop limitation for the maximum allowable rotational angle of the rotatable part of the seat. Said stopper device 20 in the form of a stopper pin 30 is fastened on a rotatable part of seat 1, notably with preference laterally on seat plate 38 on the side facing towards control unit 12.

It should be understood that stopper device 20 can also be fastened at a different site on a rotatable part of seat 1 and that the appertaining slotted stopper guide 16 is adapted to the positioning of stopper device 20.

Slotted stopper guide 16 can also be realized in the form of an upright edge. It is of essence that the stopper device 20 is able, due to the rotational movement of seat 1 and the transverse displacement of the seat, to cooperate with different stop positions of slotted stopper guide 16 with a contour 24.

Correspondingly, slotted stopper guide 16, which, as shown in FIG. 2b, is formed by a cutout 52, has limiting lines 25a,25b for left-hand rotation of the rotatable part of seat 1 and a limiting line 26 for right-hand rotation. The shape and the course of these limiting lines 25a,25b,26 can be individually adapted to the requirements of a customized construction machine 2.

In case that, for instance, optional components should be retrofitted to a construction machine 2 at a later time, while, in one of the possible positions of seat 1, such components could happen to cause a collision with the machine operator or with elements of the seat, particularly with the control lever, it is thus rendered possible to adapt to the changed circumstances.

In an electronic stop limiter device, the seat rotating device 8 comprises a rotational angle sensor which can be fastened e.g. to the rotating console 34 so as to detect the rotational position, and a path sensor on said device 6 for lateral displacement of the seat so as to detect the transverse displacement position of the seat. The measurement values of the current rotational angle and the current displacement position of the displaceable part of the seat make it possible to read maximum allowable rotational angles from a database stored in a memory so that, for each transverse displacement position, a maximum rotational angle for left-hand or right-hand rotation can be read out. Once the maximum allowable rotational angle position has been reached, a blocking device 54, designed to be activated—e.g. electronically—by the electric stop limiter device, can block a further rotational movement of seat 1.

In case that an electric stop limiter device is provided, it is also possible, if a stop abutment situation exists and a further rotation or further transverse displacement of the seat is desired, that a linear drive for the transverse displacement or a rotary drive for the seat assembly is activated in such a manner that, should the rotational angle be exceeded, the seat will be automatically displaced transversely, and that, should a limiting value for the stop limitation for the transverse displacement be exceeded, the seat will be automatically rotated back, so that the seat will always remain in the allowable positional range.

In case of a mechanical stop limiter device, it is merely required for the above purpose to release both blocking devices and to keep them in the released position, so as to allow the seat to be freely moved within the range defined by the slotted stopper guide.

It can also be provided that, at the moment when the seat 1 is not moved anymore, the blocking devices 54 and 56 will automatically enter their locked state.

Alternatively, each individual blocking device 54,56 can be separately locked by hand.

It should be understood that, in an electronic stop limiter device, the intermediate plate 14 and the stopper pin 30 are not required.

FIG. 2c is the vertical continuation, in downward direction, of the view of FIG. 2b and at the top includes a repeated representation of the mechanical stop limiter device 10 of FIG. 2b.

In FIG. 2c, the bottom side of intermediate plate 14 has fastened to it guide elements 48a and 48b of a device 40 for displacing the seat 1 in the direction of travel. These guide elements 48a and 48b cooperate with complementary guide elements 50a,50b which in turn are fastened in a stationary manner to seat console 4. The guide elements 48a,48b,50a,50b formed of rail members allow for longitudinal displacement of seat 1 parallel to the direction of travel 5 in a conventional manner. A blocking device 58 for locking and unlocking the longitudinal adjustment is preferably arranged on guide element 48b.

The seat console 4 can be attached directly to the machine frame of construction machine 2 or can be fastened to a base 60 connected to the machine frame of construction machine 2.

In practical operation of the embodiment according to FIG. 2, the stopper device 20 formed as a stopper pin 30 projecting vertically downward from seat plate 38, engages into the cutout 52 of intermediate plate 14. As a consequence, in case of a transverse displacement of the movable part of seat 1, the stopper pin 30 will be displaced within cutout 52, together with seat 1, in transverse direction relative to the direction of travel 5. In the respective transverse displacement position of seat 1 that has been set, different stop limiting surfaces on slotted stopper guide 16 that differ depending on the seat position will now be able to cooperate with stopper pin 30 so that, depending on the seat position, different maximum allowable rotational angles of seat 1 can be predefined by the cooperation of slotted stopper guide 16 and stopper pin 30.

The invention claimed is:

1. A seat apparatus for a construction machine, the construction machine having a direction of travel, the seat apparatus comprising:
   a seat;
   a seat console;
   a lateral displacement support assembly supporting the seat in an adjustable lateral position for lateral displacement relative to the seat console in a transverse direction relative to the direction of travel so that the seat can be located in a plurality of lateral positions;
   a rotational support assembly supporting the seat in an adjustable rotational angle for rotational movement of the seat through a rotational range relative to the seat console in each of the plurality of lateral positions; and
   a stop limiter configured to limit a maximum allowable value of the rotational angle of the seat in a variable manner in dependence on the lateral position of the seat.

2. The seat apparatus according to claim 1, wherein the stop limiter comprises different stop positions for rotation of the seat to a left-hand direction and to a right-hand direction, respectively.

3. The seat apparatus according to claim 1, wherein the stop limiter electronically predefines different stop positions for rotation of the seat to a left-hand direction and to a right-hand direction, respectively.

4. The seat apparatus according to claim 1, wherein the stop limiter comprises a slotted stopper guide and a stopper cooperating with the slotted stopper guide.

5. The seat apparatus according to claim 4, wherein the stop limiter is arranged between the rotational support assembly and the seat console.

6. The seat apparatus according to claim 4, wherein the stop limiter is arranged between the lateral displacement support assembly and the seat console.

7. The seat apparatus according to claim 4, wherein the slotted stopper guide comprises a contour to be abutted by the stopper at different sites in dependence on the lateral position of the seat and rotational angle of the seat so as to limit the maximum allowable value of the rotational angle of the seat.

8. The seat apparatus according to claim 7, wherein the contour of the slotted stopper guide comprises a first limiting line for left-hand rotation and a second limiting line for right-hand rotation.

9. The seat apparatus according to claim 7, wherein:
   the stop limiter further comprises an intermediate plate, the intermediate plate including the contour of the slotted stopper guide; and
   the stopper engages into the intermediate plate.

10. The seat apparatus according to claim 9, wherein the intermediate plate defines a cutout, the cutout forming the contour of the slotted stopper guide.

11. The seat apparatus according to claim 4, wherein the slotted stopper guide is coupled to the seat console and the stopper is coupled to the rotational support assembly.

12. The seat apparatus according to claim 4, wherein the slotted stopper guide includes a contour and the stopper includes at least one stopper pin arranged to abut the contour of the slotted stopper guide so as to limit the maximum allowable value of the rotational angle of the seat.

13. A seat apparatus for a construction machine, the construction machine having a direction of travel, the seat apparatus comprising:

a seat;
a seat console;
a lateral displacement support assembly supporting the seat in an adjustable lateral position for lateral displacement relative to the seat console in a transverse direction relative to the direction of travel;
a rotational support assembly supporting the seat in an adjustable rotational angle for rotational movement of the seat relative to the seat console, the rotational support assembly including:
a rotation console, the rotation console including a rotary plate having an axis of rotation; and
a seat plate rigidly fastened to the rotary plate coaxially with the axis of rotation of the rotary plate; and
a stop limiter configured to limit a maximum allowable value of the rotational angle of the seat in a variable manner in dependence on the lateral position of the seat.

14. The seat apparatus according to claim 1, further comprising a travel displacement support assembly supporting the seat in an adjustable travel position for displacement of the seat relative to the seat console in the direction of travel of the construction machine.

15. The seat apparatus according to claim 14, wherein the travel displacement support assembly is arranged between the stop limiter and the seat console.

16. A seat apparatus for a construction machine, the construction machine having a direction of travel, the seat apparatus comprising:
a seat;
a seat console;
a lateral displacement support assembly supporting the seat in an adjustable lateral position for lateral displacement relative to the seat console in a transverse direction relative to the direction of travel;
a rotational support assembly supporting the seat in an adjustable rotational angle for rotational movement of the seat relative to the seat console;
a stop limiter configured to limit a maximum allowable value of the rotational angle of the seat in a variable manner in dependence on the lateral position of the seat; and
a travel displacement support assembly supporting the seat in an adjustable travel position for displacement of the seat relative to the seat console in the direction of travel of the construction machine;
wherein:
the stop limiter includes an intermediate plate;
the lateral displacement support assembly includes a lateral guide assembly, the lateral guide assembly including:
a first lateral guide stationarily fastened to the intermediate plate; and
a second lateral guide cooperating with the first lateral guide and stationarily fastened to the rotational support assembly; and
the travel displacement support assembly includes a travel guide assembly, the travel guide assembly including:
a first travel guide stationarily fastened to the intermediate plate; and
a second travel guide cooperating with the first travel guide and stationarily fastened to the seat console.

17. The seat apparatus according to claim 16, wherein:
the intermediate plate includes a bottom side and a top side;
the first lateral guide is stationarily fastened to the top side of the intermediate plate; and
the first travel guide is stationarily fastened to the bottom side of the intermediate plate.

18. A seat apparatus for a construction machine, the construction machine having a direction of travel, the seat apparatus comprising:
a seat;
a seat console;
a lateral displacement support assembly supporting the seat in an adjustable lateral position for lateral displacement relative to the seat console in a transverse direction relative to the direction of travel;
a rotational support assembly supporting the seat in an adjustable rotational angle for rotational movement of the seat relative to the seat console, the rotational support assembly including:
a rotation console, the rotation console including a rotary plate having an axis of rotation; and
a seat plate fastened to the rotary plate such that eccentric rotation of the seat plate relative to the rotary plate is allowed; and
a stop limiter configured to limit a maximum allowable value of the rotational angle of the seat in a variable manner in dependence on the lateral position of the seat.

19. The seat apparatus according to claim 1, wherein the stop limiter comprises:
sensors configured to detect the rotational angle of the seat and the lateral position of the seat;
a memory including the maximum allowable value of the rotational angle dependent on the lateral position of the seat; and
an electronically controlled blocker configured to delimit the maximum allowable value of the rotational angle of the seat in both a left-hand direction of rotation and a right-hand direction of rotation, the maximum allowable value of the rotational angle read from the memory.

20. A seat apparatus for a construction machine, the construction machine having a direction of travel, the seat apparatus comprising:
a seat;
a seat console;
a lateral displacement support assembly supporting the seat in an adjustable lateral position for lateral displacement relative to the seat console in a transverse direction relative to the direction of travel;
a rotational support assembly supporting the seat in an adjustable rotational angle for rotational movement of the seat relative to the seat console; and
a stop limiter configured to limit a maximum allowable value of the rotational angle of the seat in a variable manner in dependence on the lateral position of the seat, the stop limiter including:
sensors configured to detect the rotational angle of the seat and the lateral position of the seat;
a memory including the maximum allowable value of the rotational angle dependent on the lateral position of the seat; and
an electronically controlled blocker configured to delimit the maximum allowable value of the rotational angle of the seat in both a left-hand direction of rotation and a right-hand direction of rotation, the maximum allowable value of the rotational angle read from the memory;
wherein the lateral displacement support assembly comprises a linear drive configured to laterally displace the seat; and wherein the stop limiter is configured to control the linear drive such that, when a user attempts to rotate the seat to a desired rotational angle beyond the maximum allowable value of the rotational angle, the seat is automatically displaced in the transverse direction to a lateral position wherein the desired rotational angle is within the maximum allowable value of the rotational angle.

21. A seat apparatus for a construction machine, the construction machine having a direction of travel, the seat apparatus comprising:
   a seat;
   a seat console;
   a lateral displacement support assembly supporting the seat in an adjustable lateral position for lateral displacement relative to the seat console in a transverse direction relative to the direction of travel;
   a rotational support assembly supporting the seat in an adjustable rotational angle for rotational movement of the seat relative to the seat console; and
   a stop limiter configured to limit a maximum allowable value of the rotational angle of the seat in a variable manner in dependence on the lateral position of the seat, the stop limiter including:
      sensors configured to detect the rotational angle of the seat and the lateral position of the seat;
      a memory including the maximum allowable value of the rotational angle dependent on the lateral position of the seat; and
      an electronically controlled blocker configured to delimit the maximum allowable value of the rotational angle of the seat in both a left-hand direction of rotation and a right-hand direction of rotation, the maximum allowable value of the rotational angle read from the memory;
   wherein the rotational support assembly comprises a rotary drive configured to rotate the seat; and
   wherein the stop limiter is configured to control the rotary drive such that, when a user attempts to laterally move the seat to a desired lateral position beyond a lateral position permitted for a current rotational angle, the seat is automatically rotated to a rotational angle wherein the desired lateral position is permitted.

22. The seat apparatus according to claim 1, further comprising a road construction machine including the seat apparatus.

* * * * *